(12) United States Patent
Crawford et al.

(10) Patent No.: US 8,479,821 B2
(45) Date of Patent: Jul. 9, 2013

(54) METHOD AND APPARATUS FOR REMOVAL OF PIGS, DEPOSITS AND OTHER DEBRIS FROM PIPELINES AND WELLBORES

(76) Inventors: James (Jim Bob) R. Crawford, Lafayette, LA (US); Jamie B. Crawford, Lafayette, LA (US); Joseph W. Elsbury, III, Broussard, LA (US)

(*) Notice: Subject to any disclaimer, the term of this patent is extended or adjusted under 35 U.S.C. 154(b) by 256 days.

(21) Appl. No.: 12/806,693

(22) Filed: Aug. 19, 2010

(65) Prior Publication Data
US 2011/0214872 A1 Sep. 8, 2011

Related U.S. Application Data

(60) Provisional application No. 61/309,908, filed on Mar. 3, 2010.

(51) Int. Cl.
*E21B 37/00* (2006.01)
(52) U.S. Cl.
USPC .............................................. 166/311; 166/99
(58) Field of Classification Search
USPC .................. 166/311, 99, 301, 98, 202, 177.3, 166/170
See application file for complete search history.

(56) References Cited

U.S. PATENT DOCUMENTS

| | | | |
|---|---|---|---|
| 5,875,803 A | 3/1999 | Leitko et al. | |
| 6,122,791 A | 9/2000 | Baugh et al. | |
| 6,475,294 B2 | 11/2002 | McCanna et al. | |
| 6,651,744 B1 | 11/2003 | Crawford | |
| 7,025,142 B2 | 4/2006 | Crawford | |
| 7,178,588 B2 | 2/2007 | Harper et al. | |
| 7,644,463 B1 | 1/2010 | Crawford et al. | |
| 2003/0140946 A1 | 7/2003 | Coats | |
| 2004/0118565 A1 | 6/2004 | Crawford | |
| 2004/0194809 A1* | 10/2004 | Crawford et al. | 134/22.12 |
| 2004/0247451 A1 | 12/2004 | Durward | |
| 2005/0076724 A1* | 4/2005 | Boudreaux | 73/866.5 |
| 2005/0283927 A1 | 12/2005 | Kinnari et al. | |
| 2007/0044448 A1 | 3/2007 | Bosley et al. | |
| 2009/0199873 A1 | 8/2009 | Pruett | |
| 2009/0260695 A1 | 10/2009 | France et al. | |
| 2010/0044053 A1 | 2/2010 | Grimseth et al. | |

OTHER PUBLICATIONS

Davidson; "An Introduction to Pipeline Pigging;" Halliburton Pipeline and Process Services—Pigging Products and Services Association; 12 pages; Copyright 2002.
Verleun; "Cleaning of Oil & Gas Pipelines On-Line & Off-Line—N-Spec® an activity of Brenntag;" 5 pages; Pigging Products and Services Association; Copyright 2003.

(Continued)

*Primary Examiner* — David Bagnell
*Assistant Examiner* — Taras P Bemko
(74) *Attorney, Agent, or Firm* — The Matthews Firm

(57) ABSTRACT

A carrier assembly having at least one sealing cup, a fluid bypass and adjustable wash nozzles, as well as a spear assembly having a central through bore, are attached to the distal end of a length of continuous tubing and inserted in to the flow bore of a pipeline. Fluid is pumped through the annular space between the carrier assembly and the pipeline, providing motive force for advancing the carrier assembly within the pipeline. Fluid can bypass the carrier assembly, enter the central bore of the spear assembly, and return to the surface through the central bore of the continuous tubing. A stuck pig or other obstruction is speared, and thereafter retrieved from the pipeline on the continuous tubing.

14 Claims, 6 Drawing Sheets

OTHER PUBLICATIONS

Russel et al.; "Development of a Pig Based Inspection Tool Utilising Maps Stress Measurement Technology;" 10 pages; Pigging Products and Services Association; Copyright 2007.

Stanley; "A Contraflow Tetherless Mechanical Pipeline Crawler;" RST Projects Ltd, a Weatherford Company—Pigging Products and Services Association; 9 pages; Copyright 2003.

"Pigging: Increasing Appreciation of an Industry Truly Come of Age;" Pipeline and Gas Journal; Aug. 2002; 4 pages.

Fretwell; "Developments in Mechanical Production Cleaning of Pipelines;" Pipeline Engineering—Pigging Products and Services Association; 10 pages; Copyright 2007.

Stoltze; "A New Pipeline Cleaning Technology: Hydraulically Activated Power Pigging (HAPP™);" 6 pages; Pigging Products and Services Association; Copyright 2007.

Nicholson; "Smart Utility Pig Technology in Pipeline Operations;" Weatherford Pipeline & Specialty Services—Pigging Products and Services Association; 12 pages; Copyright 2004.

PCT International Search Report and Written Opinion for Application No. PCT/US2011/000409, dated Jul. 26, 2011 (12 pages).

Response to PCT International Search Report and Written Opinion for Application No. PCT/US2011/000409, dated May 26, 2011 (3 pages).

* cited by examiner

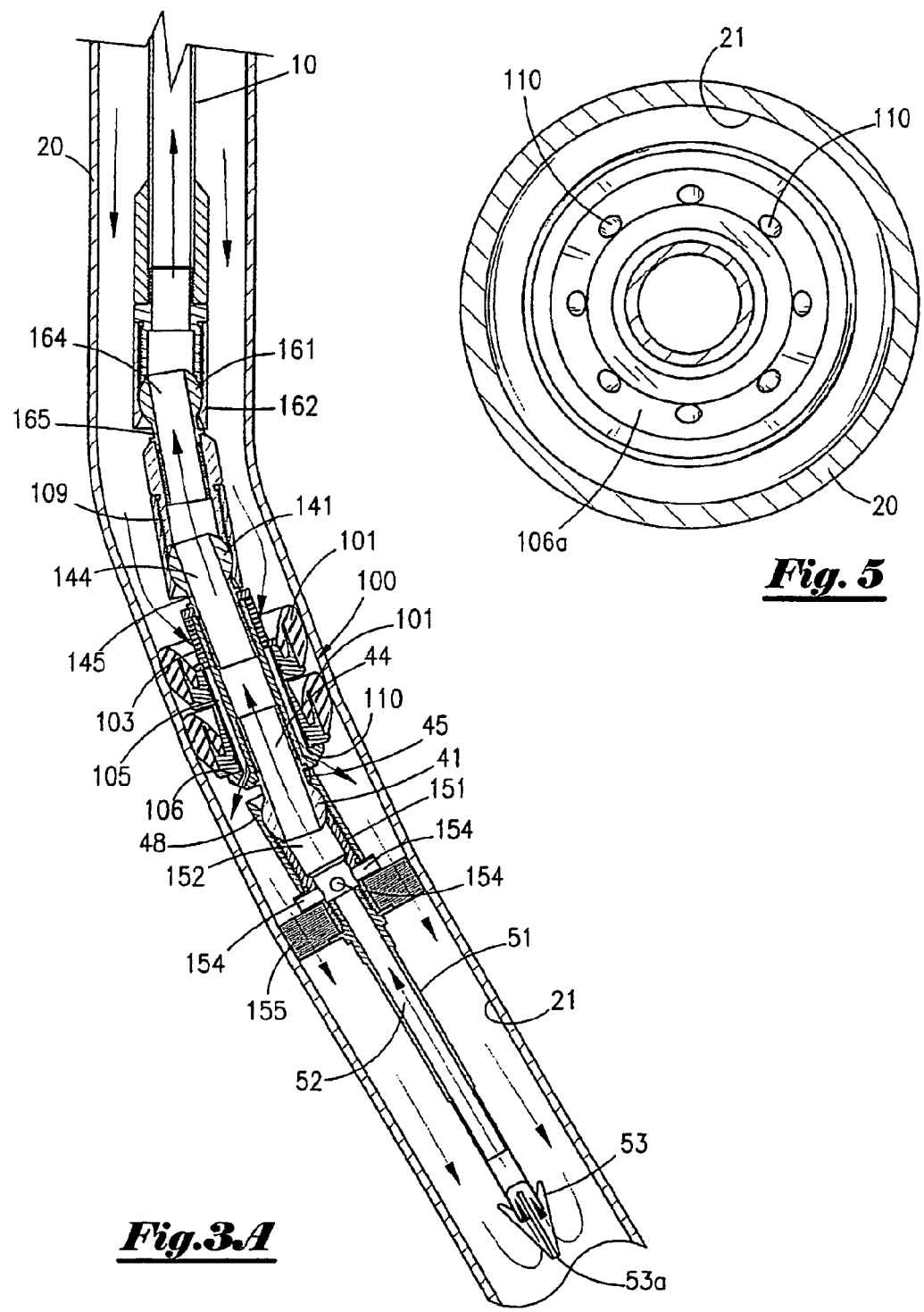

METHOD AND APPARATUS FOR REMOVAL OF PIGS, DEPOSITS AND OTHER DEBRIS FROM PIPELINES AND WELLBORES

CROSS REFERENCES TO RELATED APPLICATION

Priority of U.S. Provisional Patent Application Ser. No. 61/309,908 filed Mar. 3, 2010, both incorporated herein by reference, is hereby claimed.

STATEMENTS AS TO THE RIGHTS TO THE INVENTION MADE UNDER FEDERALLY SPONSORED RESEARCH AND DEVELOPMENT

None
INVENTORS:
  James Bruce Crawford
  James Robert Crawford
  Joseph W. Elsbury, III

BACKGROUND OF THE INVENTION

1. Field of the Invention

The present invention relates to a method and apparatus for the removal of obstructions, deposits and/or other debris from pipelines, wellbores and other confined areas. More particularly, the present invention relates to a method and apparatus for use of continuous tubing to remove obstructions restricting or completely preventing flow in pipelines or well bores including, without limitation, stuck pigs, hydrate plugs, scale, paraffin and/or other debris.

2. Brief Description of the Prior Art

As known deposits of oil and gas become depleted, exploration for new deposits must be undertaken in more remote locations. This is especially true with offshore oil and gas operations; many current exploration and development activities are conducted a great distance from land in deep water environments.

Many offshore wells, particularly wells drilled in deep water environments, are drilled and completed using floating drilling rigs, such as drill ships and semi-submersible drilling rigs. In such cases, wellhead assemblies are typically not located on a permanently anchored support structure or floating rig, but rather on the sea floor. As a result, specialized equipment known as "subsea" wellhead assemblies are utilized. In such cases, the subsea wellhead assemblies are situated on the sea floor, while pipelines are used to connect such subsea wellheads to one another and/or to surface facilities that gather and process production from the subsea wells. Additionally, larger pipelines are routinely used to gather production from multiple offshore installations and transport such production to shore.

As relatively hot hydrocarbons are produced from subterranean reservoirs up to wellhead equipment situated at the sea floor, and thereafter through pipelines extending along the sea floor, such hydrocarbons are cooled by the relatively low temperature of the surrounding water. Frequently, this cooling can occur rapidly, causing wax or paraffin present in hydrocarbons to solidify. Such solid materials can be deposited or "plated" on the internal diameters of such pipelines, restricting or clogging the flow bores in said pipelines and limiting passage therethrough.

A common treatment for the removal of deposits and/or other debris on the internal surfaces of pipelines involves the insertion of mechanical cleaning devices—commonly referred to as "pigs"—into the flow bores of such pipelines. Although such pigs have many different shapes and sizes, pigs are typically cylindrical or spherical tools that can be used to mechanically scrape paraffin and/or other debris from the internal surfaces of pipelines.

Frequently, as a pig passes through a pipeline and mechanically scrapes paraffin and/or other debris from the inner surfaces of such pipeline, the paraffin and/or debris can accumulate along the leading edge(s) of the pig. As such paraffin and/or debris collects, it can build up and restrict the internal opening of the pipeline, eventually forming an obstruction that can limit forward progress of the pig. This action can continue until fluid pressure behind the pig is no longer capable of forcing the pig through the line. Eventually, the pig can become stuck, such that it can not be moved by pressure from either direction, with the internal opening of the pipeline becoming fully obstructed.

In recent years, oil and gas operators have discovered an alternative to conventional rig operations that uses a length of continuous, flexible tubing rather than multiple sections of rigid pipe. This alternative, commonly referred to as "coiled tubing", utilizes a continuous length (up to 10,000 feet or more) of flexible tubing which is stored on a reel. Such conventional coiled tubing can be partially unspooled from such reel and translated in and out of a wellbore in a virtually continuous manner without having to continually connect and/or disconnect individual pipe sections as with jointed pipe.

In recent years, continuous tubing has been beneficially used in connection with efforts to remove stuck pigs and/or other obstructions (including, without limitation, hydrate plugs, scale, paraffin or other debris) from pipelines. Such continuous tubing can be concentrically inserted into a pipeline and used to push or otherwise urge stuck pigs or other obstructions through the internal flow bore of a pipeline. Because the continuous tubing is relatively flexible, it can be rolled off a large reel (such as from a boat or other support structure) and into a pipeline. Further, multiple tubing strings can be joined together to allow for increased length, and tools or other beneficially-designed equipment can be attached to such continuous tubing in order to engage a pig or other obstruction in the pipeline.

Large forces are often required to force extended lengths of continuous tubing into a pipeline that may be filled with hydrocarbons, solid deposits and/or other materials. While conventional devices known as injector heads can be used to grip the continuous tubing and mechanically force it into the pipeline from the surface, such tubing can become bent, kinked or "corkscrewed" during this process. Furthermore, in the event that the continuous tubing enters a horizontal section of pipeline, the weight of the tubing can act against the internal surfaces of the pipeline, thereby creating frictional forces that impede the forward progress of the tubing through the pipeline. As a result, conventional injector heads and other similar devices have proven to be less than satisfactory for purposes of conveying continuous tubing within pipelines.

Other methods have been developed in an effort to increase the length to which continuous tubing can be injected into pipelines. For example, one such method entails utilizing a thruster device installed on the distal end of a section of continuous tubing, and utilizing a pressure differential across the thruster pig to generate force needed to advance the tubing within the pipeline. However, the subject thruster device is not capable of simultaneously advancing in the pipeline and cleaning away obstructions in said pipeline. Moreover, the thruster device will not allow pieces of debris to be circulated out of the pipeline behind the thruster device.

Thus, it is an object of the present invention to provide a method and apparatus for cleaning pipelines and removing stuck pigs at great distances (up to 10 miles and beyond) using continuous tubing. It is a further object of the present invention to safely extend the horizontal reach of continuous tubing in pipelines and/or other similar controlled environments, while permitting the use of down hole motors, bit slammers, fishing over- shots, memory tools and/or other conventional coiled tubing tools, including tools requiring internal flow actuation.

It is yet another object of the present invention to provide a method and apparatus for creating a jetting action in a pipeline at or near the distal end of a string of continuous tubing, while advancing such tubing forward to a desired location of a stuck pig or other restriction or obstruction within said pipeline.

It is yet another object of the present invention to provide a method and apparatus for providing a check valve system to permit the relief of compressed fluids as a stuck pig or other obstruction is speared or otherwise gripped using continuous tubing, as well as the removal of said pig or other obstruction.

SUMMARY OF THE PRESENT INVENTION

In the preferred embodiment, the present invention comprises a carrier assembly having a plurality of adjustable pre-programmed high pressure wash nozzles. Said carrier assembly can be advanced within a pipeline or well bore (including, without limitation, horizontal portions thereof) to a pre-determined location by pumping fluid into an annular space formed between said pipeline/wellbore and said carrier assembly. Said carrier assembly also provides a reverse circulation flow path to transfer fluid flow between the annulus and the tubing; that is, fluid pumped down the annulus can cross over through said carrier assembly, with such fluid being returned to the surface through the internal bore of the tubing. The circulation feature of said carrier assembly enables the use of tools requiring internal flow actuation including, without limitation, positive displacement motors, hip trippers, spinning wash tools, hydraulic fishing tools or the like.

In the preferred embodiment, the carrier assembly of the present invention maintains a pre-set, substantially constant pressure across said carrier assembly as fluid is pumped down a pipeline or well bore. The carrier assembly of the present invention also beneficially includes at least one sealing cup designed for extreme service and flexibility for wear. Said at least one sealing cup is further equipped with internal support to prevent said at least one cup from flipping or inverting when exposed to high pressures. In the preferred embodiment, said at least one sealing cup is beneficially spring loaded to bias said cup against the internal surface(s) of a pipeline or wellbore for longer cup wear, yet capable of sufficient compression to permit bi-directional service.

Further provided within said carrier assembly is an internal flow regulator and hydraulic control wash nozzles pre-set to maintain a pre-determined force that allows flow through said wash nozzles at pre-determined pressure(s). In the preferred embodiment, a spear assembly having a central bore is attached to said carrier assembly. Pumped fluids bypass said sealing cup(s), enter the flow-bore of said spear assembly, and return to the surface via the internal bore of the continuous tubing. The pre-set nozzle(s) in the carrier assembly help provide a motive force that propels the carrier assembly and attached coiled tubing down the pipeline as fluid is pumped at a pre-determined rate(s) and pressure(s).

All job site data can be logged in an on-site monitoring console, which can operate all parameters of a particular job. Said monitoring console can beneficially monitor and control loads, depth, pump pressure, running speeds and barrels pumped per minute.

In the preferred embodiment, the present invention provides an apparatus to safely extend the horizontal reach of coiled tubing in a controlled environment to clean out sections of pipelines and/or wellbores (including horizontal sections thereof) and to remove stuck pigs at great distances from a pipeline entry point. The present invention further provides a new method of generating a jetting action in a pipe line or wellbore using pre-set wash nozzles while advancing continuous tubing forward to a desired location of a stuck pig or other obstruction in said pipeline or wellbore. Additionally, the present invention provides a check valve system allowing the relief of compressed fluids as a stuck pig or other obstruction is speared or otherwise gripped. Once a pig or other obstruction is speared or otherwise gripped, the pig or other obstruction can then be retrieved from said pipeline using the continuous tubing.

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed.

FIG. 3A depicts a side sectional view of a carrier assembly of the present invention and associated equipment conveyed via continuous tubing within a section of pipe.

FIG. 5 depicts a front view of nozzles of the present invention shown across line 5-5 of FIG. 4.

DETAILED DESCRIPTION OF A PREFERRED EMBODIMENT OF THE INVENTION

Figure 1:
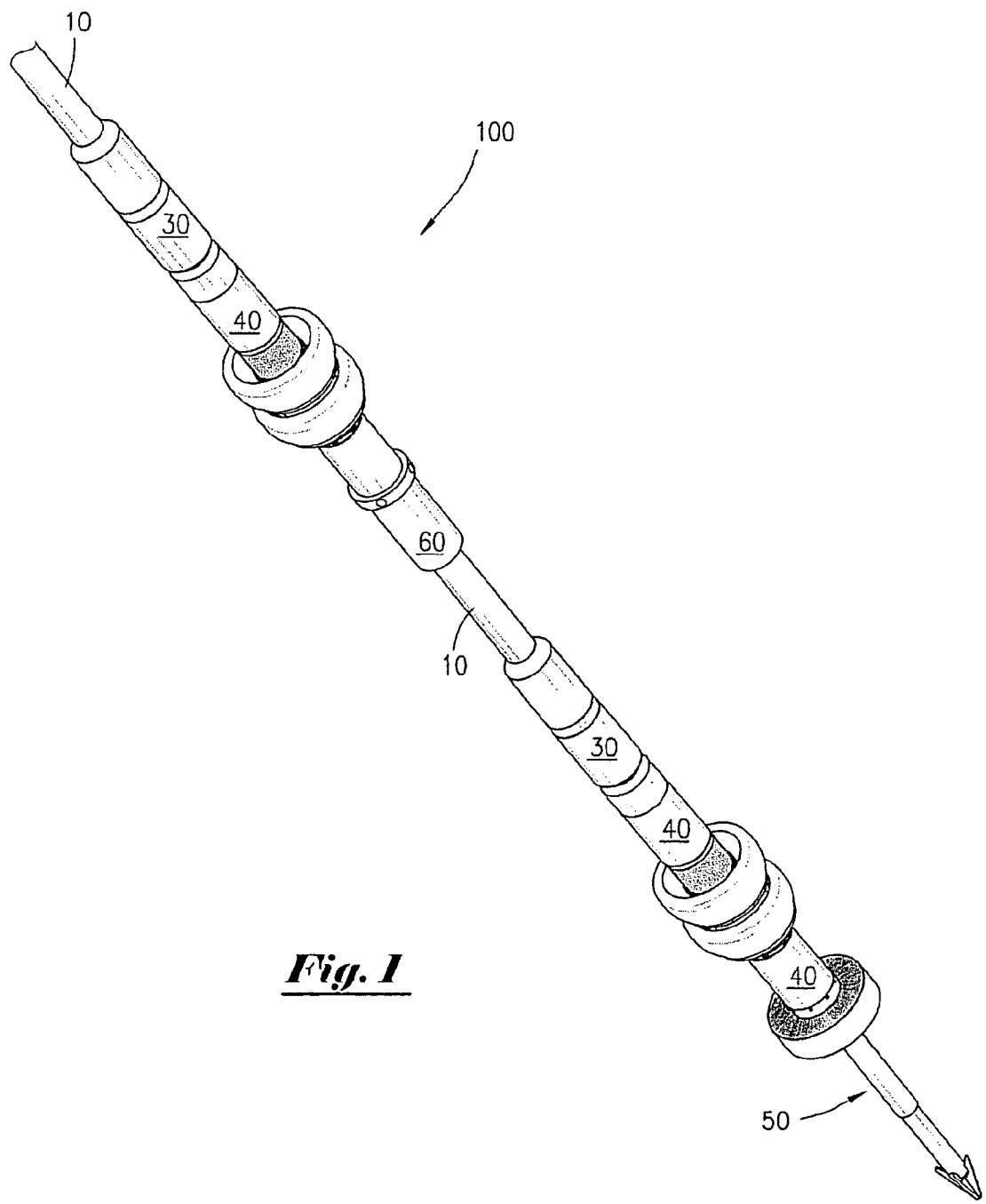
FIG. 1 depicts a perspective view of a plurality of carrier assemblies of the present invention, together with other associated equipment, conveyed via continuous tubing.

FIG. 1 depicts a perspective view of a plurality of carrier assemblies 100 of the present invention deployed via continuous tubing string 10, such as a length of continuous tubing associated with conventional coiled tubing units well known to those having skill in the art. Although the present invention is described herein primarily with regard to uses related to pipelines, it is to be observed that the present invention can also be used in connection with other applications or environments, such as within wellbores and the like. Further, although a plurality of carrier assemblies 100 are depicted in FIG. 1, such carrier assemblies 100 may be conveyed individually on a single length of continuous tubing, depending upon job parameters of a particular application.

Figure 2:
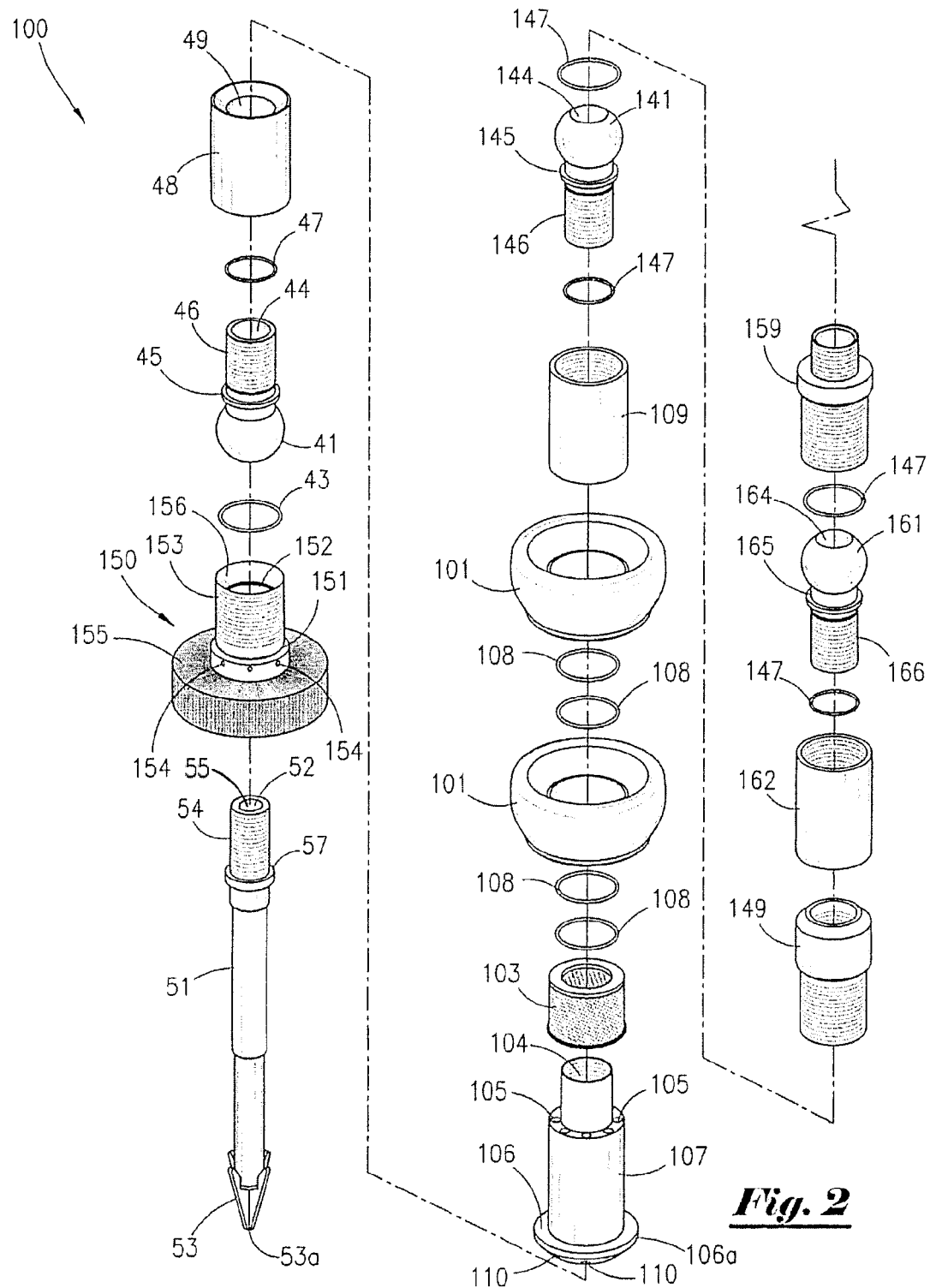
FIG. 2 depicts an exploded view of a carrier assembly of the present invention, together with additional equipment.

Still referring to FIG. 1, carrier assemblies 100 are depicted as being optionally deployed in tandem with other devices well known to these having skill in the art. Such devices depicted in FIG. 1 include slip joint connector assemblies 30, knuckle joint assemblies 40, spear assembly 50 and overshot assembly 60. It is to be observed that such devices depicted in FIG. 1 are illustrative only. FIG. 1 is not intended to be a comprehensive listing of all tools that can be utilized in connection with carrier assembly 100, to suggest that all such tools must be used together, or to be otherwise limiting in any way. FIG. 2 depicts an exploded view of a carrier assembly 100 of the present invention, together with certain associated equipment described more fully herein. Spear extension member 51 has internal central bore 52, and spear head member 53 having sharpened tip 53a. In the preferred embodiment, spear extension member 51 has external threads 54 and shoulder member 57. Spear bypass assembly 150 having body member 151 can be connected to spear extension 51. Body member 151 beneficially has central flow bore 152, external threads 153, bypass ports 154 and brush member 155. In the preferred embodiment, brush member 155 extends radially outward around the periphery of body member 151, while body member 151 has tapered inner shoulder 156.

Still referring to FIG. 2, elastomer sealing ring 43 is received within bore 152. Knuckle joint body member 45 has substantially spherical head member 41, central flow bore 44 and threads 46. In the preferred embodiment, elastomer seal ring 47 is disposed in central bore 49 of sleeve member 48, which is in turn received over substantially spherical head member 41.

Carrier assembly 100 generally comprises central body member 107 having central flow bore 104 and shoulder section 106 defining shoulder surface 106a. At least one flow channel 105 extends through central body member 107 and, in the preferred embodiment, said at least one flow channel 105 is oriented substantially parallel to central bore 104. Screen member 103 is connected to central body member 107, while hydraulic control wash nozzles 110 are disposed at bottom end of said at least one channel 105. In the preferred embodiment screen 103 is disposed at or near the fluid inlet(s) to said at least one channel 105, while nozzles 110 are disposed at the outlet(s) of said at least one channel 105. As fluid is pumped, nozzles 110 of carrier assembly 100 of the present invention act to beneficially maintain a pre-set, substantially constant pressure across said carrier assembly 100 as more fully described herein.

Still referring to FIG. 2, in the preferred embodiment, carrier assembly 100 of the present invention further comprises elastomer seal rings 108 and sealing cups 101. First upper knuckle joint body member 145 has substantially spherical head member 141, central flow bore 144 and threads 146. In the preferred embodiment, elastomer seal rings 147 provide a fluid pressure seal between spherical head member 141 and sleeve 109. Similarly, second upper knuckle joint body member 165, connected to body member 149, has substantially spherical head member 161, central flow bore 164 and threads 166. In the preferred embodiment, elastomer seal rings 147 provide a fluid pressure seal between spherical head member 161 and the internal surface of sleeve 162. Connection member 159 permits connection of such assembly to additional components conveyed into a well or pipeline.

FIG. 3A depicts a side sectional view of a carrier assembly 100 of the present invention and associated equipment conveyed via continuous tubing 10 within a section of pipeline 20. Spear extension member 51 has internal central bore 52, and spear head member 53 having substantially sharpened tip 53a. Body member 151 beneficially has central flow bore 152, bypass ports 154 and brush member 155. In the preferred embodiment, brush member 155 extends radially outward to contact inner surface 21 of pipeline 20. Knuckle joint body member 45 has substantially spherical head member 41, having central flow bore 44, which is rotatably received within sleeve member 48. Carrier assembly 100 is connected thereto, and can be conveyed into pipeline 20 via continuous tubing 10. First upper knuckle joint body member 145 has substantially spherical head member 141 and central flow bore 144; substantially spherical head member 141 is rotatably received within sleeve 109. Second upper knuckle joint body member 165 has substantially spherical head member 161 and central flow bore 164; substantially spherical head member 161 is rotatably received within sleeve 162. Said knuckle joint assemblies permit carrier assembly 100 and associated equipment to pass through bends, restrictions or confined spaces existing in pipeline 20.

Figure 3B:
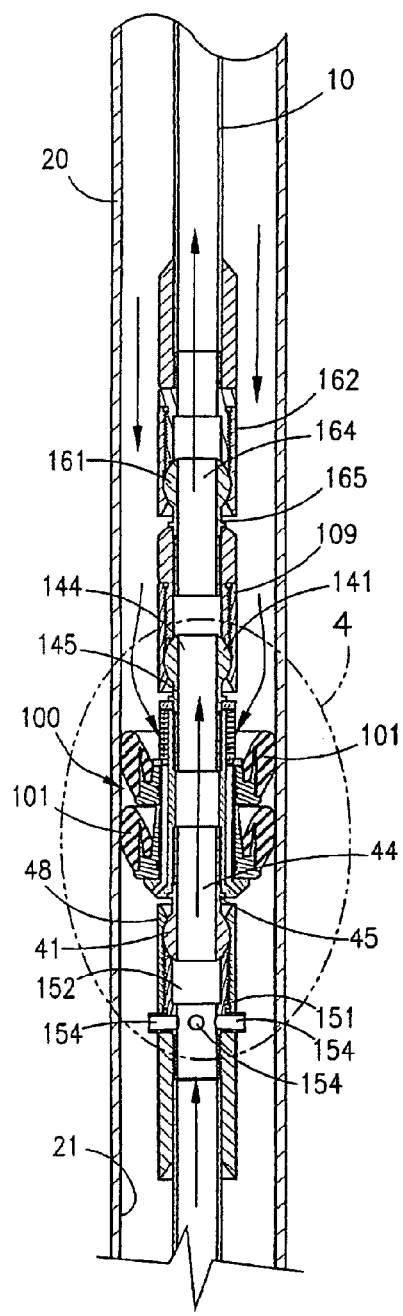
FIG. 3B depicts a side sectional view of the carrier assembly of the present invention conveyed via continuous tubing within a section of pipe.

FIG. 3B depicts a side sectional view of carrier assembly 100 of the present invention conveyed via continuous tubing 10 within a section of pipeline 20. Body member 151 beneficially has central flow bore 152, bypass ports 154 and brush member 155 (not depicted in FIG. 3B). Lower knuckle joint body member 45 has spherical head member 41, having central flow bore 44, which is rotatably received within sleeve member 48.

Carrier assembly 100 is connected to first upper knuckle joint body member 145 having spherical head member 141 and central flow bore 144, which is rotatably received within sleeve member 109. Upper knuckle joint body member 165 has spherical head member 161 and central flow bore 164, which is rotatably received within sleeve member 162.

Figure 4:
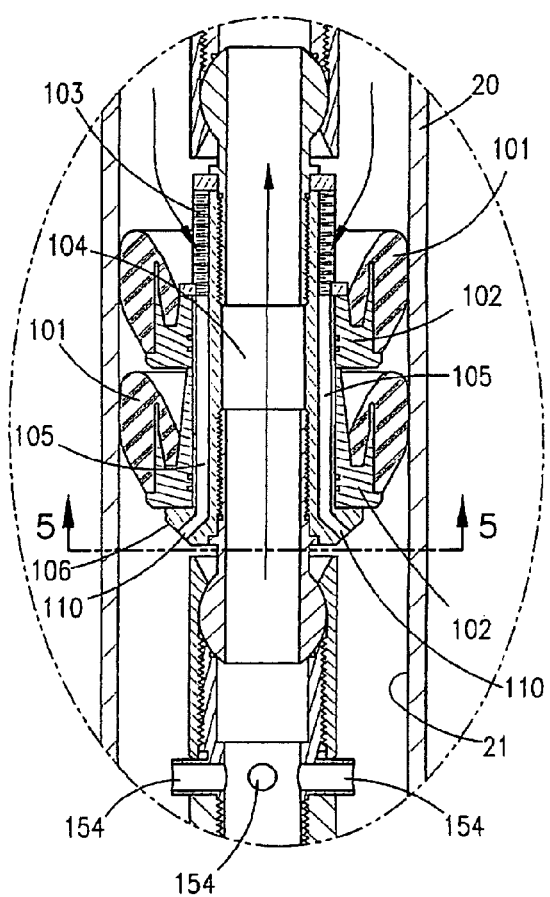
FIG. 4 depicts a detailed side sectional view of a carrier assembly of the present invention depicted in FIG. 3B.

FIG. 4 depicts a detailed side sectional view of a carrier assembly 100 of the present invention depicted in FIG. 3B. In the preferred embodiment, carrier assembly 100 of the present invention beneficially includes at least one sealing cup 101 designed for extreme service and flexibility for wear. Although said at least one sealing cup 101 can be constructed of many different materials, in the preferred embodiment said at least one sealing cup 101 is beneficially constructed of flexible hardened rubber, elastomer or other similar moldable material. Further, each of said at least one sealing cups 101 includes internal support member 102 to prevent said sealing cups 101 from flipping or inverting at high pressures. In the preferred embodiment, said internal support members 102 are constructed of metal or other material providing similar characteristics provide strength, and also act to bias said sealing cups 101 outward to sealingly engage against internal surface(s) 21 of pipeline 20, yet also permit said cups 101 to partially collapse to permit bi-directional service.

At least one flow channel 105 extends through carrier assembly 100 and, in the preferred embodiment, is oriented substantially parallel to central bore 104. Screen 103 disposed at the upper end of said at least one channel 105, while hydraulic control wash nozzles 110 are disposed at the lower ends of said at least one channel 105. In the preferred embodiment screen, 103 is positioned at or near the upper fluid inlet to said at least one channel 105, while nozzles 110 are disposed at the lower outlet of said at least one channel 105. Nozzles 110 of carrier assembly 100 of the present invention beneficially maintain a pre-set, substantially constant pressure across said carrier assembly 100 as fluid is pumped within pipeline 20 toward said carrier assembly 100.

FIG. 5 depicts a front view of nozzles 110 of the present invention shown across line 5-5 of FIG. 4. In the preferred embodiment, said nozzles 110 are disposed in a substantially circular pattern on shoulder surface 106a. Further, said nozzles 110 are beneficially oriented outward—that is, away from the center of carrier assembly 100 and generally toward internal surface 21 of pipeline 20 (in the preferred embodiment, at an angle between 40 and 50 degrees relative to the longitudinal axis of central bore 104 of carrier assembly 100). In the preferred embodiment, hydraulic control wash nozzles 110 are directionally adjustable and can be beneficially preset to maintain flow through said nozzles 110 at pre-determined rate(s) and pressure(s).

Figure 6:
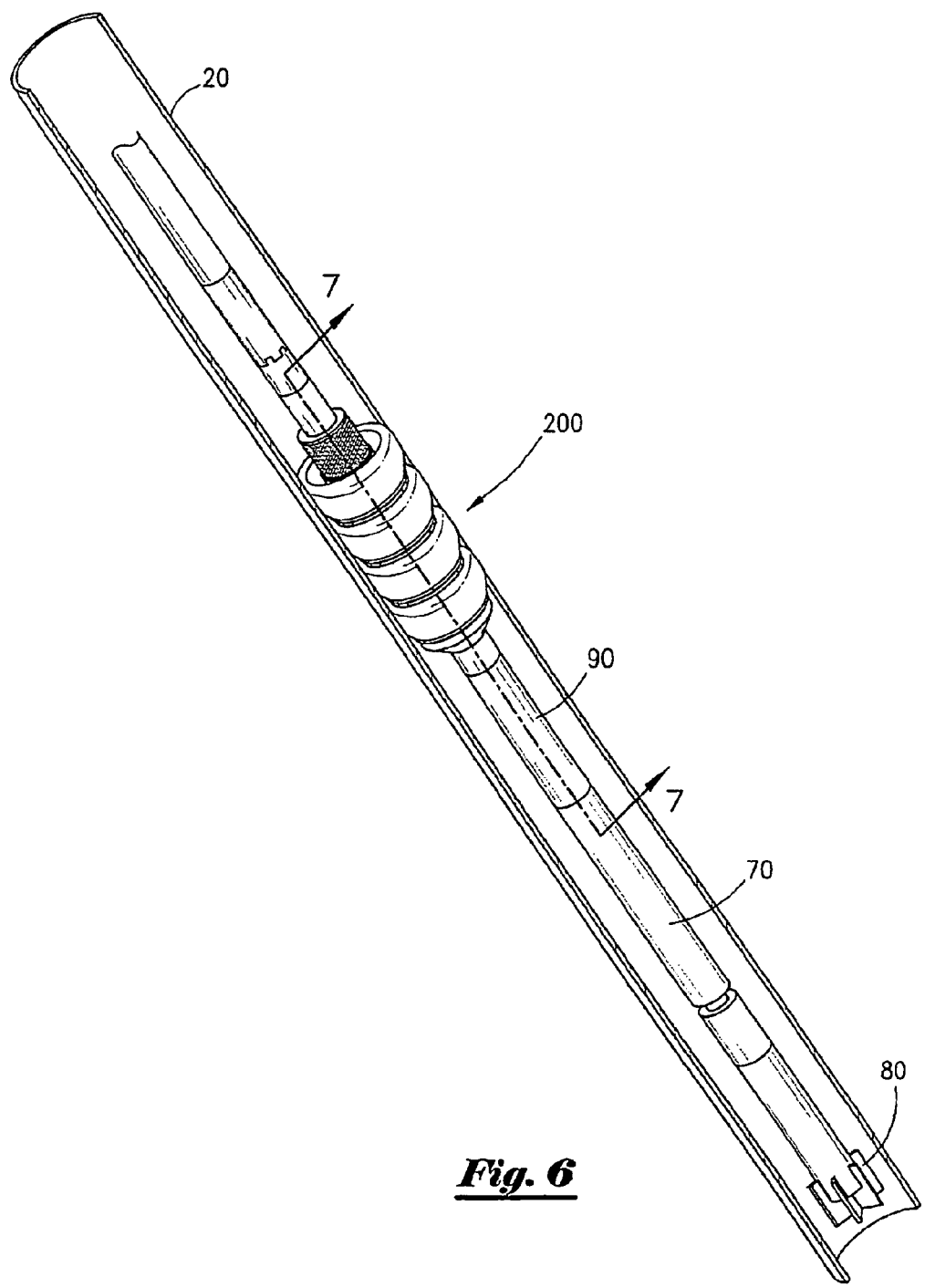
FIG. 6 depicts a side perspective view of a carrier assembly of the present invention deployed in connection with a mud motor and mill.

FIG. 6 depicts a side perspective view of an alternative embodiment carrier assembly 200 of the present invention deployed in connection with a choke sub 90, mud motor 70 and mill 80. Mud motor 70 and mill 80, as depicted in FIG. 6, are fluid-actuated tools well known to those having skill in the art. Said devices can be used to mechanically cut, abrade or grind stuck pigs or otherwise clear obstructions that may be encountered within pipeline 20.

Figure 7:
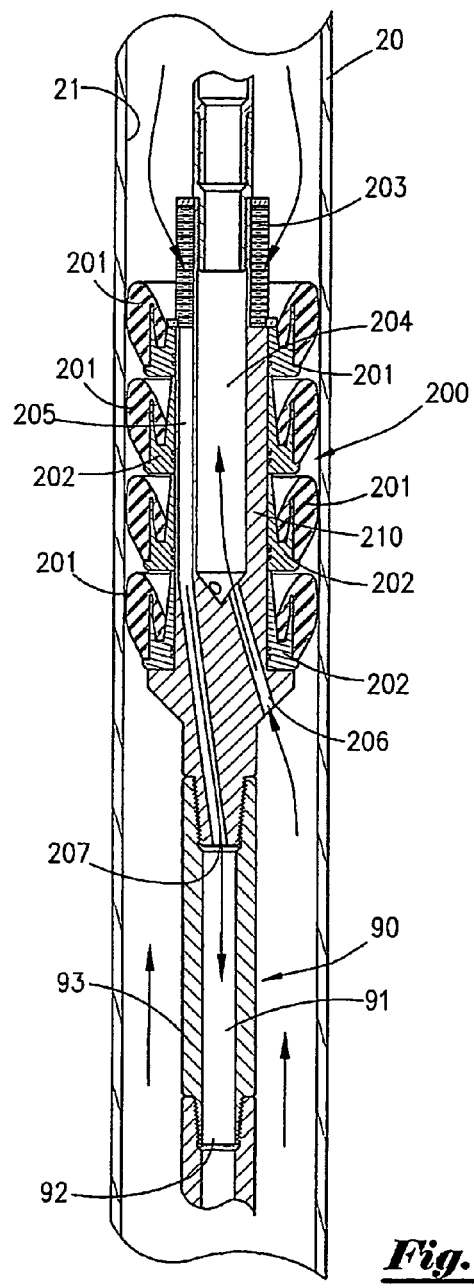
FIG. 7 depicts a side sectional view of a carrier assembly of the present invention installed in connection with a choke sub along line 7-7 of FIG. 6.

FIG. 7 depicts a side sectional view of a carrier assembly 200 of the present invention installed in connection with a choke sub 90 along line 7-7 of FIG. 6. Choke sub 90 has body 93, central flow bore 91 and choke outlet 92. Alternative embodiment of carrier assembly 200 has a different flow path than carrier assembly 100 depicted in FIG. 4; such flow path permits fluid cross-over through and around carrier assembly 200 in the manner more fully described below.

Still referring to FIG. 7, alternative embodiment carrier assembly 200 of the present invention beneficially includes body member 210, central longitudinal internal flow bore 204 extending therethrough and at least one sealing cup 201 disposed around the outer surface of said body member 210. Although said at least one sealing cup 201 can be constructed of many different materials, in the preferred embodiment said at least one sealing cup 201 is constructed of flexible hardened rubber, elastomer or other similar material. Further, each of said at least one sealing cup 201 includes internal support member 202 constructed of metal or other material having similar characteristics to prevent said sealing cups 201 from flipping or inverting at high pressures. In the preferred embodiment, said internal support members 202 provide strength, and also bias said sealing cups 201 outward to sealingly engage against internal surface(s) 21 of pipeline 20, yet also allow said cups 201 to partially collapse to permit bi-directional service. At least one flow channel 205 extends through carrier assembly body member 210 and, in the preferred embodiment, is oriented substantially parallel to central bore 204. Screen 203 is disposed at the upstream end of each at least one flow channel 205. Flow channel 205 extends through body member 210 to outlet port 207. Outlet port 207 of carrier assembly 200 is in fluid communication with bore 91 of choke sub 90. Crossover channel 206 extends from the outer surface of body member 210 to central bore 204.

In the preferred embodiment, the present invention provides an apparatus to safely extend the horizontal reach of coiled tubing in a controlled environment to clean sections of pipelines and/or wellbores (including horizontal sections thereof) and to remove stuck pigs and/or other obstructions. The present invention further provides a method of generating a jetting action in a pipe line or wellbore using adjustable intelligent wash nozzles, while also advancing continuous tubing forward to a desired location within a pipeline or wellbore. Additionally, the present invention provides a check valve system 55 allowing the relief of compressed fluids, by opening and closing the check valve system, as a stuck pig or other obstruction is speared or otherwise gripped.

In operation, referring to FIG. 3A, carrier assembly 100 can be concentrically advanced within a pipeline, such as pipeline 20 (including, without limitation, horizontal sections thereof), to a pre-determined distance by pumping fluid into annular space formed between the inner surface 21 of pipeline 20 and carrier assembly 100. Said fluid can flow through screens 103, into flow channel(s) 105, and out wash nozzles 110. Screens 103 serve to prevent debris and/or other materials from entering flow channel(s) 105 and plugging wash nozzles 110. Fluid exiting nozzles 110 provides a jetting action directed at inner surface 21 of pipeline 20 that can remove debris from such inner surface 21. Further, such fluid applies pressure across the area of carrier assembly 100 (including sealing cups 101), while providing motive force to propel carrier assembly 100 (and associated coiled tubing and equipment) within pipeline 20 as fluid is pumped at pre-determined rates and pressures. Such motive force can be used to propel carrier assembly 100 further into pipeline 20, even while surface equipment such as an injector head is unable to push such continuous tubing into such pipeline 20.

Carrier assembly 100 also provides a reverse circulation flow path to permit the transfer of fluid between the annulus and a length of continuous tubing conveying carrier assembly 100; that is, fluid pumped down the annulus from the surface can be returned to the surface through the internal bore of the continuous tubing. This reverse circulation feature of carrier assembly 100 of the present invention enables the use of tools requiring internal flow actuation including, without limitation, positive displacement motors, hip trippers, spinning wash tools, hydraulic fishing tools or the like. For example, still referring to FIG. 3A, fluid exiting wash nozzles 110 can flow around spear assembly 50 and into internal bore 52 of spear assembly 50. Such fluid can thereafter flow through central bore 52 of spear extension 51, into bore 44 of knuckle joint assembly 40 and, ultimately, through the internal flow bore of continuous tubing 10 used to convey carrier assembly 100 into pipeline 20, often carrying debris or suspended solids from pipeline 20. If desired, such fluid can be filtered or cleaned to remove such debris or suspended solids from such fluid, and the clean fluid can then be re-circulated into the pipeline or wellbore.

In the event that fluid flow into bore 52 through flow spear head member 53 is restricted or blocked (such as, for example, when a pig or other obstruction is speared, and the pig blocks flow through said spear head member 53, fluid can instead enter bypass ports 154 and pass through flowbore 152 and, ultimately, back to the surface.

Referring to the alternate embodiment carrier assembly 200 depicted in FIG. 7, fluid can be pumped into the annular space formed between inner surface 21 of pipeline 20 and alternate carrier assembly embodiment 200. Said fluid flows through screens 203, through flow channel(s) 205, and out end 207. The fluid then enters central bore 91 of choke sub 90, and exits said choke sub 90 through choke outlet 92. Such fluid can thereafter return into carrier assembly 200 via crossover channel 206 which is in fluid communication with central flow bore 204; such fluid can then return to the surface via continuous tubing or other flow conduit connected to assembly 200.

An on-site monitoring console can be provided to control and monitor all parameters of an operation including, without limitation, coiled tubing system, pressure pumps, running speeds, hydraulic force, pressures, and pump rate. If desired, monitoring console can be controlled by a computer processor such as, for example, a lap top computer to provide real-time information to a remote monitoring and/or control station.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for removing obstructions from a pipeline comprising:
    a body member having a flow bore extending therethrough and a flow bore outlet, and at least one flow channel having an inlet and an outlet disposed through said body member;
    at least one sealing cup disposed on said body member between the inlet and outlet of said at least one flow channel, sealingly engaging the inner surface of said pipeline;
    a nozzle on the outlet of said at least one flow channel;
    a spear assembly having a first end, a second end and a spear assembly flow bore extending therethrough, wherein said first end is connected to said body member, said second end forms a point, and said spear assembly flow bore is in fluid communication with the flow bore;
    a knuckle joint between the body member and the spear assembly; and
    a check valve system having open and closed positions, disposed between said first and second ends of said spear assembly, said check valve system permitting fluid communication between the outer surface and the spear assembly flow bore when in an open position.

2. The apparatus of claim 1, wherein said at least one sealing cup further comprises:
    a rigid frame; and
    at least one elastomer attached to said rigid frame.

3. The apparatus of claim 1, further comprising a screen assembly disposed over the inlet of said at least one flow channel.

4. The apparatus of claim 1, wherein said nozzle comprises an adjustable wash nozzle.

5. The apparatus of claim 1, wherein said nozzle is oriented at an angle between 40 and 50 degrees relative to the inner surface of said pipeline.

6. The apparatus of claim 1, further comprising at least one brush connected to the outer surface of said spear assembly.

7. A method for removing an obstruction from a pipeline comprising:
    connecting an obstruction removal apparatus to a length of continuous tubing, said obstruction removal apparatus comprising:
        a body member having a flow bore extending therethrough and a flow bore outlet, and at least one flow channel having an inlet and an outlet disposed through said body member;
        at least one sealing cup disposed on said body member between the inlet and outlet of said at least one flow channel, sealingly engaging the inner surface of said pipeline;
        a nozzle on the outlet of said at least one flow channel;
        a spear assembly having a first end, a second end and a spear assembly flow bore extending therethrough, wherein said first end is connected to said body member, said second end is pointed, and said spear assembly flow bore is in fluid communication with the flow bore;
        a knuckle joint between the body member and the spear assembly; and
        a check valve system having open and closed positions, disposed between said first and second ends of said spear assembly, said check valve system permitting fluid communication between the outer surface and the spear assembly flow bore when in an open position;
    conveying said obstruction removal apparatus into a pipeline;
    gripping an obstruction; and
    removing said obstruction from said pipeline.

8. The method of claim 7, further comprising the step of pumping fluid into said pipeline.

9. The method of claim 8, wherein said fluid is pumped into the annular space between said continuous tubing and pipeline, circulated through said obstruction removal apparatus, and recovered through said continuous tubing.

10. The method of claim 7, wherein said at least one sealing cup further comprises:
    a rigid frame; and
    at least one elastomer attached to said rigid frame.

11. The method of claim 7, wherein said obstruction removal apparatus further comprises a screen assembly disposed over the inlet of said at least one flow channel.

12. The method of claim 7, wherein said nozzle comprises an adjustable wash nozzle.

13. The method of claim 7, wherein said nozzle is oriented at an angle between 40 and 50 degrees relative to the inner surface of said pipeline.

14. The method of claim 7, wherein said obstruction removal apparatus further comprises at least one brush connected to the outer surface of said spear assembly.

* * * * *